United States Patent
Chen et al.

(10) Patent No.: US 11,052,436 B2
(45) Date of Patent: Jul. 6, 2021

(54) LASER CLEANING APPARATUS AND LASER CLEANING METHOD

(71) Applicant: INDUSTRIAL TECHNOLOGY RESEARCH INSTITUTE, Hsinchu (TW)

(72) Inventors: Chun-Ming Chen, Hsinchu (TW); Chien-Jung Huang, Hsinchu (TW); Yu-Chung Lin, Hsinchu (TW); Chieh-Ting Tseng, Hsinchu (TW); Min-Kai Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 438 days.

(21) Appl. No.: 16/133,199

(22) Filed: Sep. 17, 2018

(65) Prior Publication Data

US 2019/0314871 A1 Oct. 17, 2019

(30) Foreign Application Priority Data

Apr. 13, 2018 (TW) ................................ 107112771

(51) Int. Cl.
*B08B 7/00* (2006.01)
*B23K 26/064* (2014.01)
(Continued)

(52) U.S. Cl.
CPC .......... *B08B 7/0042* (2013.01); *B23K 26/067* (2013.01); *B23K 26/0643* (2013.01); *B23K 26/0648* (2013.01)

(58) Field of Classification Search
CPC .............. B08B 7/0042; B23K 26/0643; B23K 26/0648; B23K 26/067; B23K 26/352; B32K 26/0626
See application file for complete search history.

(56) References Cited

U.S. PATENT DOCUMENTS 3,914,013 A * 10/1975 Rosenberg ........... B23K 26/042
385/33
5,227,607 A * 7/1993 Ishiyama ............ G03F 7/70091
219/121.68
(Continued)

FOREIGN PATENT DOCUMENTS

CN 1939643 A 4/2007
CN 101574697 A 11/2009
(Continued)

OTHER PUBLICATIONS

Machine translation of Japan Patent document No. 2002-316,289, Jan. 2021.*

(Continued)

*Primary Examiner* — Geoffrey S Evans
(74) *Attorney, Agent, or Firm* — Rabin & Berdo, P.C.

(57) ABSTRACT

A laser cleaning apparatus and a laser cleaning method are furnished, for switching the wavelengths of laser beams furnished by a single laser module using a wavelength switching module and cleaning a test piece using the laser beams having wavelengths and energy suitable for manufacturing needs. The laser cleaning method includes: creating a laser beam; switching the wavelength output by the laser based on process requirements; propagating the laser beam via an optical path propagating module for laser cleaning the test piece; and removing debris. A transfer platform allows movements of the laser beams with respect to the test piece to achieve cleaning of the entire test piece. A control module controls the wavelength switching unit, the laser beam regulating module, and the transfer platform. Total laser cleaning with improved laser cleaning quality is achieved by using these laser beams with the appropriate wavelengths and energy.

40 Claims, 15 Drawing Sheets

(51) Int. Cl.
*B23K 26/06* (2014.01)
*B23K 26/067* (2006.01)

(56) References Cited

U.S. PATENT DOCUMENTS

| | | | | |
|---|---|---|---|---|
| 5,257,706 | A | * 11/1993 | McIntyre | B23K 26/16 219/121.61 |
| 5,771,260 | A | * 6/1998 | Elliott | G02B 7/00 372/109 |
| 6,555,781 | B2 | 4/2003 | Ngoi et al. | |
| 6,635,845 | B2 | 10/2003 | Lee et al. | |
| 6,908,567 | B2 | * 6/2005 | Uziel | B08B 7/0035 134/1.1 |
| 9,061,304 | B2 | 6/2015 | Miller et al. | |
| 2004/0101000 | A1 | * 5/2004 | Han | H01S 3/109 372/22 |
| 2005/0184133 | A1 | * 8/2005 | Clauberg | B08B 7/0042 228/203 |
| 2005/0232316 | A1 | * 10/2005 | Akasaka | B23K 26/0665 372/25 |
| 2006/0196858 | A1 | * 9/2006 | Barron | B23K 26/03 219/121.69 |
| 2007/0225692 | A1 | * 9/2007 | Somani | A61F 9/008 606/5 |
| 2007/0250049 | A1 | * 10/2007 | Feige | B23K 26/043 606/5 |
| 2009/0245318 | A1 | * 10/2009 | Clifford, Jr. | H01S 3/025 372/107 |
| 2010/0038560 | A1 | * 2/2010 | Tokura | B23K 26/06 250/492.1 |
| 2012/0293868 | A1 | * 11/2012 | Wang | G02B 5/3041 359/485.03 |
| 2013/0126490 | A1 | 5/2013 | Lee et al. | |
| 2013/0178972 | A1 | * 7/2013 | Goldsmith | B23K 26/60 700/166 |
| 2015/0225891 | A1 | * 8/2015 | Clowes | C11D 11/0078/137 |
| 2016/0346873 | A1 | * 12/2016 | Szelagowski | G02B 7/004 |

FOREIGN PATENT DOCUMENTS

| | | | |
|---|---|---|---|
| CN | 205129189 U | | 4/2016 |
| JP | 05104276 A | * | 4/1993 |
| JP | 2002316289 A | * | 10/2002 |
| TW | 499344 B | | 8/2002 |
| TW | 543097 B | | 7/2003 |
| TW | 201009345 A | | 3/2010 |
| TW | I458211 B | | 10/2014 |
| WO | WO-2015180361 A1 | | 12/2015 |

OTHER PUBLICATIONS

Taiwan Patent Office, Office Action, Patent Application Serial No. TW107112771, dated Mar. 19, 2019, Taiwan.

She et al., Liquid-assisted pulsed laser cleaning using near-infrared and ultraviolet radiation; Journal of Applied Physis; Dec. 1999; Vil. 86, No. 11, pp. 6519-6524.

Stritta et al., Laser spot welding of copper-aluminum joints using a pulsed dual wavelength laser at 532 and 1064nm; Physics Procedia; Sep. 2014; vol. 56, No. 7759, pp. 759-767.

Kochanenko et al., Designing a beam expander for dual-wave laser fluorescence lidar; Optical Society of America; Apr. 2012; vol. 79, Issue 4, pp. 217-219.

* cited by examiner

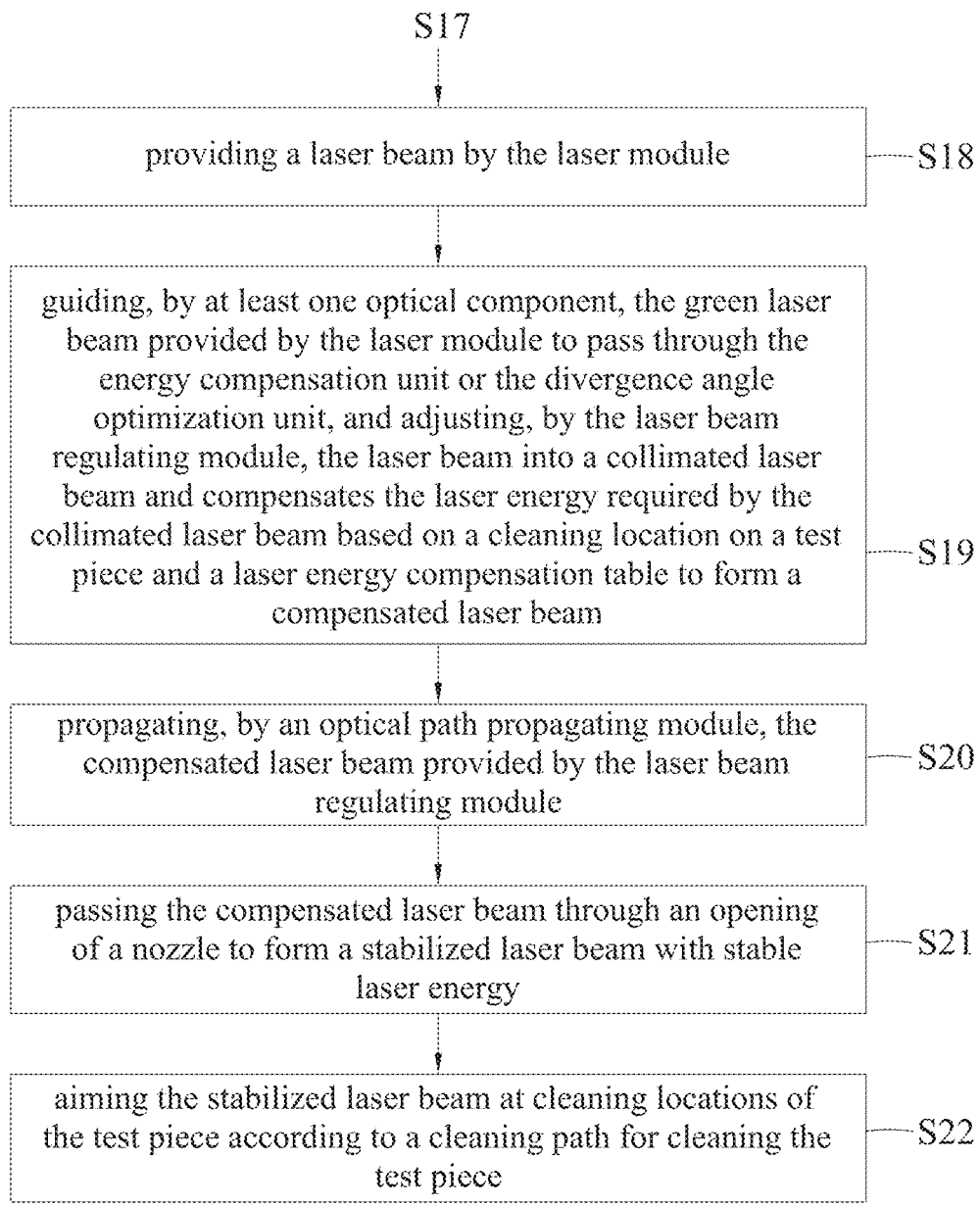
FIG. 6 (continuation)

| Cleaning Location | Proximal End (A1) | Distal End (A25) |
|---|---|---|
| Optical Path Length of Laser Beam | Short (1034 mm) | Long (1194 mm) |
| Size of Laser Beam | Small (12.5 mm) | Large (15 mm) |
| Opening of Nozzle | Fixed (12 mm) | Fixed (12 mm) |
| Area Masked by Nozzle | Little (Outer Ring 0.5 mm) | A Lot (Outer Ring 3 mm) |
| Laser Energy on Test Piece Before Compensation | Large | Small |
| Compensation Parameter for Laser Energy | Small | Large |
| Laser Energy on Test Piece After Compensation | Stable | Stable |

FIG. 7

| A1 | A2 | A3 | A4 | A5 |
|---|---|---|---|---|
| A6 | A7 | A8 | A9 | A10 |
| A11 | A12 | A13 | A14 | A15 |
| A16 | A17 | A18 | A19 | A20 |
| A21 | A22 | A23 | A24 | A25 |

FIG. 11A

| 452 (A1) | 450 (A2) | 445 (A3) | 440 (A4) | 436 (A5) |
|---|---|---|---|---|
| 449 (A6) | 447 (A7) | 442 (A8) | 436 (A9) | 435 (A10) |
| 448 (A11) | 443 (A12) | 440 (A13) | 436 (A14) | 434 (A15) |
| 441 (A16) | 439 (A17) | 439 (A18) | 436 (A19) | 428 (A20) |
| 435 (A21) | 437 (A22) | 438 (A23) | 432 (A24) | 420 (A25) |

FIG. 11B

| 0.00% (A1) | 0.44% (A2) | 1.55% (A3) | 2.65% (A4) | 3.54% (A5) |
|---|---|---|---|---|
| 0.66% (A6) | 1.11% (A7) | 2.21% (A8) | 3.54% (A9) | 3.76% (A10) |
| 0.88% (A11) | 1.99% (A12) | 2.65% (A13) | 3.54% (A14) | 3.98% (A15) |
| 2.43% (A16) | 2.88% (A17) | 2.88% (A18) | 3.54% (A19) | 5.31% (A20) |
| 3.76% (A21) | 3.32% (A22) | 3.10% (A23) | 4.42% (A24) | 7.08% (A25) |

FIG. 11C

LASER CLEANING APPARATUS AND LASER CLEANING METHOD

CROSS-REFERENCE TO RELATED APPLICATION

The present disclosure is based on and claims priority from Taiwan Application Number 107112771, filed Apr. 13, 2018, the disclosure of which is hereby incorporated by reference herein in its entirety.

FIELD OF THE DISCLOSURE

The present disclosure relates to laser cleaning apparatuses and laser cleaning methods, and, more particularly, to a laser cleaning apparatus and a laser cleaning method for cleaning test pieces (e.g., probe cards).

BACKGROUND OF THE DISCLOSURE

Wafer probers are used for determining the qualities of integrated circuits (ICs) and to save packaging costs. At present, semiconductor companies restore the electrical performance of probe cards by mechanically grinding the probes thereon. However, due to the height differences between the probes, the potential of probe collisions is high, and, therefore, a laser cleaning technique is preferred.

In an IC manufacturing apparatus, since a test piece (e.g., probe card) is kept stationary, laser beams need to be propagated in the apparatus and "flying optics" is performed. However, in this way, there will be differences (about 160 mm) in the optical path lengths of the laser beams at different cleaning positions (e.g., at the distal and proximal ends) of the test piece, so that the laser beams have different cleaning qualities for the different cleaning positions of the test piece, which makes it difficult for the laser beams to clean the test piece (probes) completely and residues may remain.

At the same time, the laser beams have large divergence angles, such that the diameter (about 12.5 mm) of a laser beam at the proximal end of the test piece and the diameter (about 15 mm) of a laser beam at the distal end of the test piece may be different, resulting in different or non-stable laser energy at different cleaning positions (e.g., proximal end and distal end) of the test piece, and it is difficult to ensure the cleaning quality of the laser beams to the test piece (probes).

As shown in FIG. 1, a probe card (probes) was used to test wafers of an IC manufacturing process 100 times, buildup of tin (Sn) residues at the tips of the probe card (test piece) can be seen.

As shown in FIG. 2, the probe card was cleaned using laser. After the probe card is cleaned, an oxide such as tin oxide ($SnO_2$) was formed at the tips of the probe card. This will affect the electrical performance. Mechanical grinding of the probes is still needed to strip off the oxide layer. High density (diameter <30 μm) probe card cleaning cannot be performed with contact (mechanical) grinding. Contact cleaning methods fail to meet the requirements of the IC manufacturing processes. It would be desirable to provide a laser cleaning method for probe cards that eliminates the risk of probe collisions due to the height differences between the probes and prolongs the service life of the probe card.

Therefore, how to solve the above problems of the prior art has become a major issue for those skilled in the art.

SUMMARY OF THE DISCLOSURE

In an embodiment according to the present disclosure, a laser cleaning apparatus is used for cleaning a test piece. The laser cleaning apparatus may include: a carrier; a laser module furnished above the carrier for providing a laser beam; a laser beam regulating module furnished above the carrier including an energy compensation unit and a divergence angle optimization unit, wherein the divergence angle optimization unit is configured for adjusting the laser beam into a collimated laser beam, and the energy compensation unit is configured for compensating laser energy required by the laser beam based on a cleaning location of the test piece to form a compensated laser beam; a wavelength switching unit for switching the wavelength outputted by the laser beam in accordance with process requirements; and at least an optical element for guiding the laser beam furnished by the laser module to pass through at least one of the energy compensation unit and the divergence angle optimization unit.

In an embodiment according to the present disclosure, a laser cleaning method is used for cleaning a test piece. The laser cleaning method may include: providing a laser cleaning apparatus including a laser module, a wavelength switching unit, a laser beam regulating module further including an energy compensation unit and divergence angle optimization unit, as well as at least one optical element; providing a laser beam through the laser module; adjusting the wavelength switching unit to allow the laser beam to pass through a double-frequency crystal to generate a laser beam containing green light with a wavelength of 532 nm and infrared light with a wavelength of 1064 nm, which then passes through a beam splitter to generate a green laser beam with a wavelength of 532 nm to be outputted to the laser beam regulating module; guiding the green laser beam which is provided by the laser module through the optical element to pass through at least one of the energy compensation unit and the divergence angle optimization unit; propagating the green laser beam from the at least one of the energy compensation unit and the divergence angle optimization unit by an optical path propagating module and performing a first cleaning process to clean the probe tips containing the dirty layer of tin (Sn); adjusting the angle of the reflecting mirror in the wavelength switching unit to allow the laser beam of the laser module to pass underneath the reflecting mirror, and outputting the infrared laser beam with a wavelength of 1064 nm into the laser beam regulating module; guiding the infrared laser beam which is provided by the laser module through the optical element to pass through at least one of the energy compensation unit and the divergence angle optimization unit; and propagating the infrared laser beam from the at least one of the energy compensation unit and the divergence angle optimization unit by the optical path propagating module and performing a first cleaning process to clean the probe tips containing the dirty layer of tin oxide ($SnO_2$).

In an embodiment, the optical element guides the laser beam to pass through at least one of the energy compensation unit and the divergence angle optimization unit; and the propagating an optical path propagating module propagating the laser beam from the at least one of the energy compensation unit and the divergence angle optimization unit by for cleaning the test piece with the laser beam.

The foregoing features and advantages of the present disclosure will become more apparent from the following detailed description taken in conjunction with the accompanying drawings. Additional features and advantages of the present disclosure will be set forth in part in the description which follows, or may be learned by practice of the disclosure. The features and advantages of the present disclosure are recognized and attained by means of elements and combinations thereof particularly specified in the appended claims. It should be understood that both the foregoing general description and the following detailed description are exemplary and explanatory only and are not intended to limit the scope of the disclosure as claimed.

BRIEF DESCRIPTION OF THE DRAWINGS

FIG. 7 is a table showing comparisons of data associated with a laser beam being propagated to a proximal end versus to a distal end of a test piece;

FIG. 11A is a location table including a plurality of cleaning locations of a test piece in the laser cleaning apparatus shown in FIGS. 5A and 5B;

FIG. 11B is a laser energy table including a plurality of laser energy values generated by a control module according to the present disclosure measuring the laser energy at the various locations of FIG. 11A;

FIG. 11C is a laser energy compensation table including a plurality of compensation parameters created based on the laser energy table of FIG. 11B;

DETAILED DESCRIPTION OF THE EMBODIMENTS

The embodiments of present disclosure are described by the following specific implementations. One of ordinary skill in the art can readily understand other advantages and effects of the present disclosure upon reading the disclosure of this specification. The present disclosure may also be practiced or applied with other different implementations.

Figure 1:
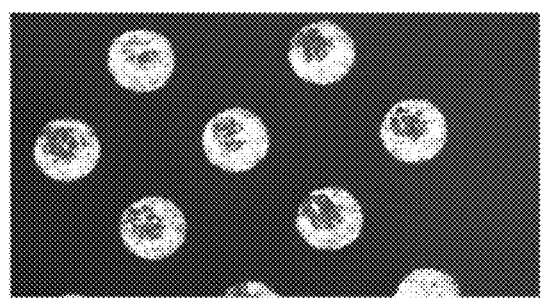
FIG. 1 is a schematic diagram depicting dirt layers containing tin (Sn) formed at the tips of a probe card.
Figure 2:
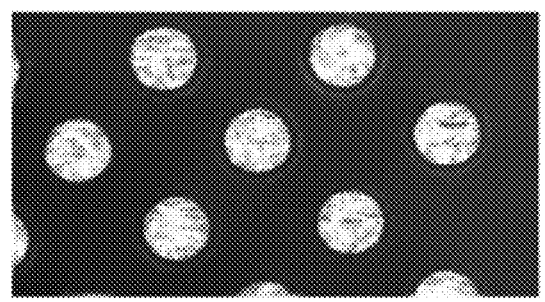
FIG. 2 is a schematic diagram depicting oxide formed at the tips of the probe card after cleaning.
Figure 3:
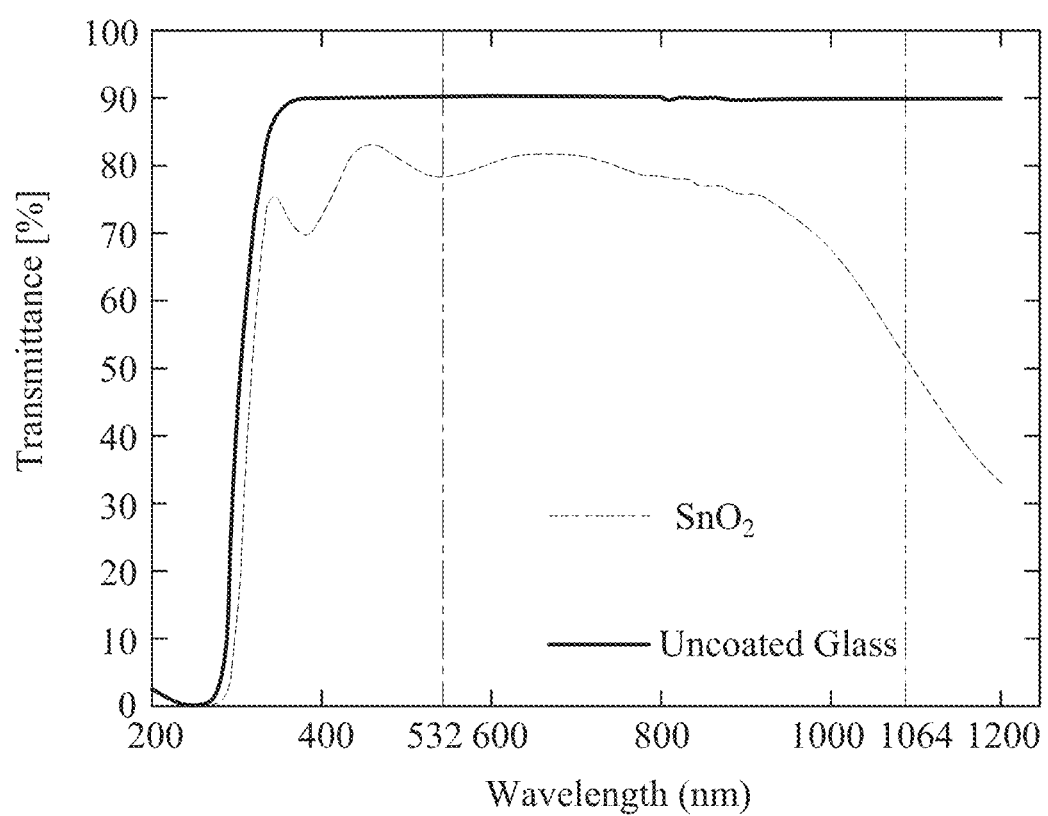
FIG. 3 is a spectral analysis diagram.

FIG. 3 is a spectral analysis diagram. Based on this spectral analysis diagram, a transparent oxide layer of $SnO_2$ (tin oxide) has low absorption rate with respect to green laser beams with a visible wavelength of 532 nm, therefore green laser beams are not suitable for removing $SnO_2$. As can be seen from the analysis result of laser verification and an Energy Dispersive Spectrometer (EDS), an infrared (IR) light with a wavelength of 1064 nm has the optimum cleaning result for removing the oxide layer. Therefore, in the present disclosure, a laser cleaning apparatus 2 removes a dirt layer containing tin (Sn) at the tips of test piece 9 using a green laser with a wavelength of 532 nm, and then removes a dirt layer containing $SnO_2$ at the tips of the test piece 9 using an infrared laser with a wavelength of 1064 nm.

Figure 4A:
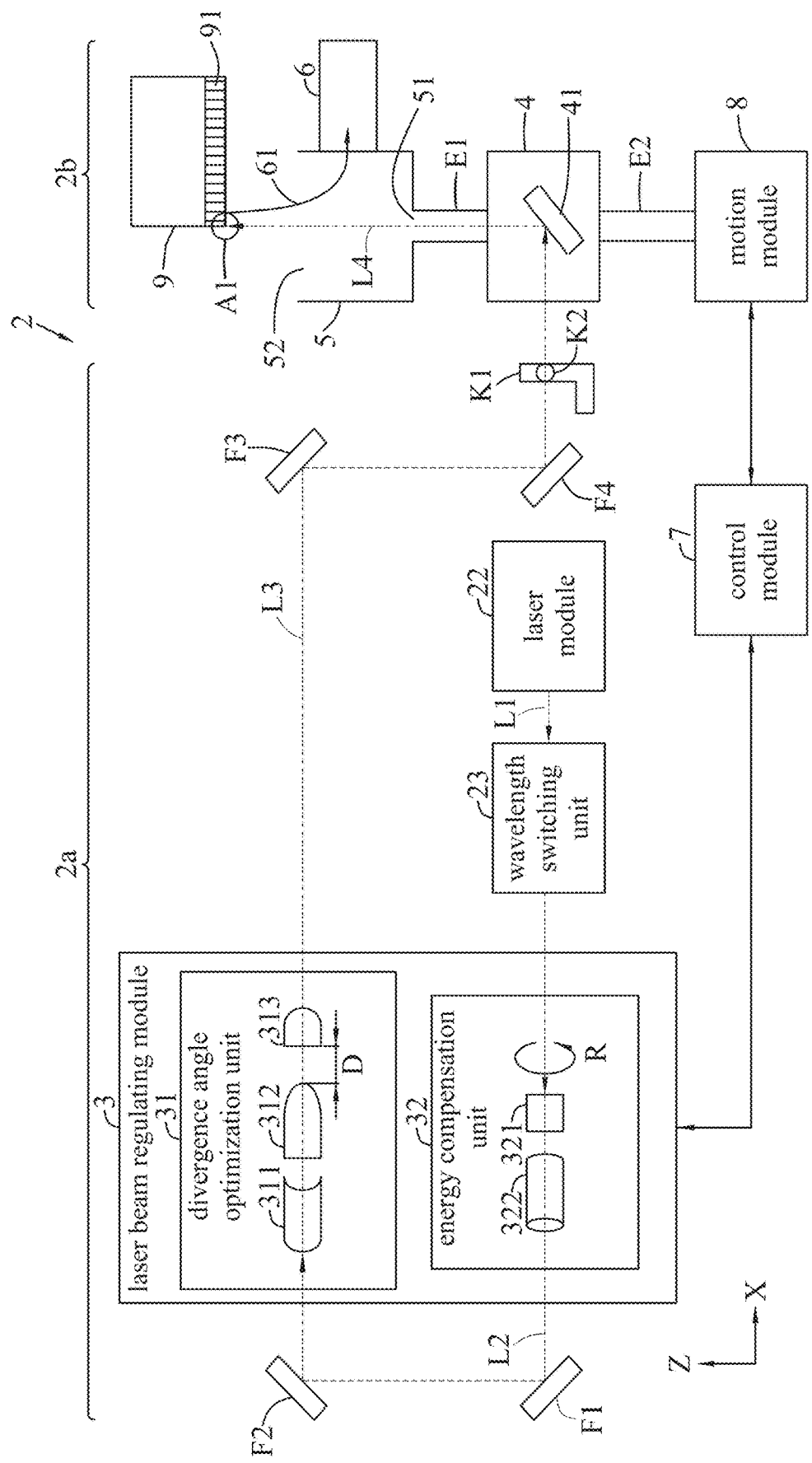
FIGS. 4A and 4B are schematic diagrams depicting a laser cleaning apparatus in accordance with a first embodiment of the present disclosure, wherein a motion module may move the optical path propagating module, a nozzle, and a stabilized laser beam to correspond to different cleaning locations of a test piece.
Figure 4B:
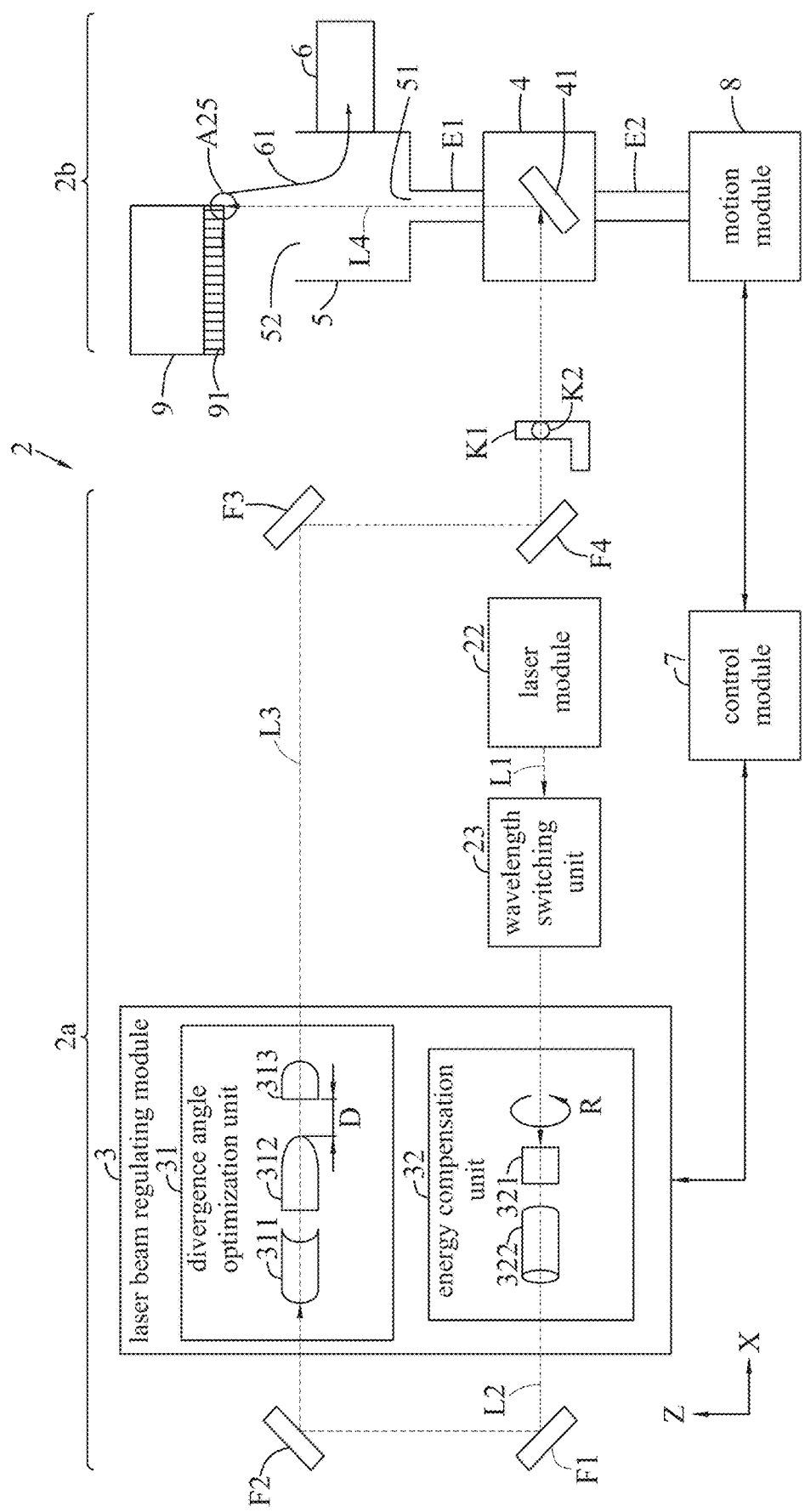
Figure 5A:
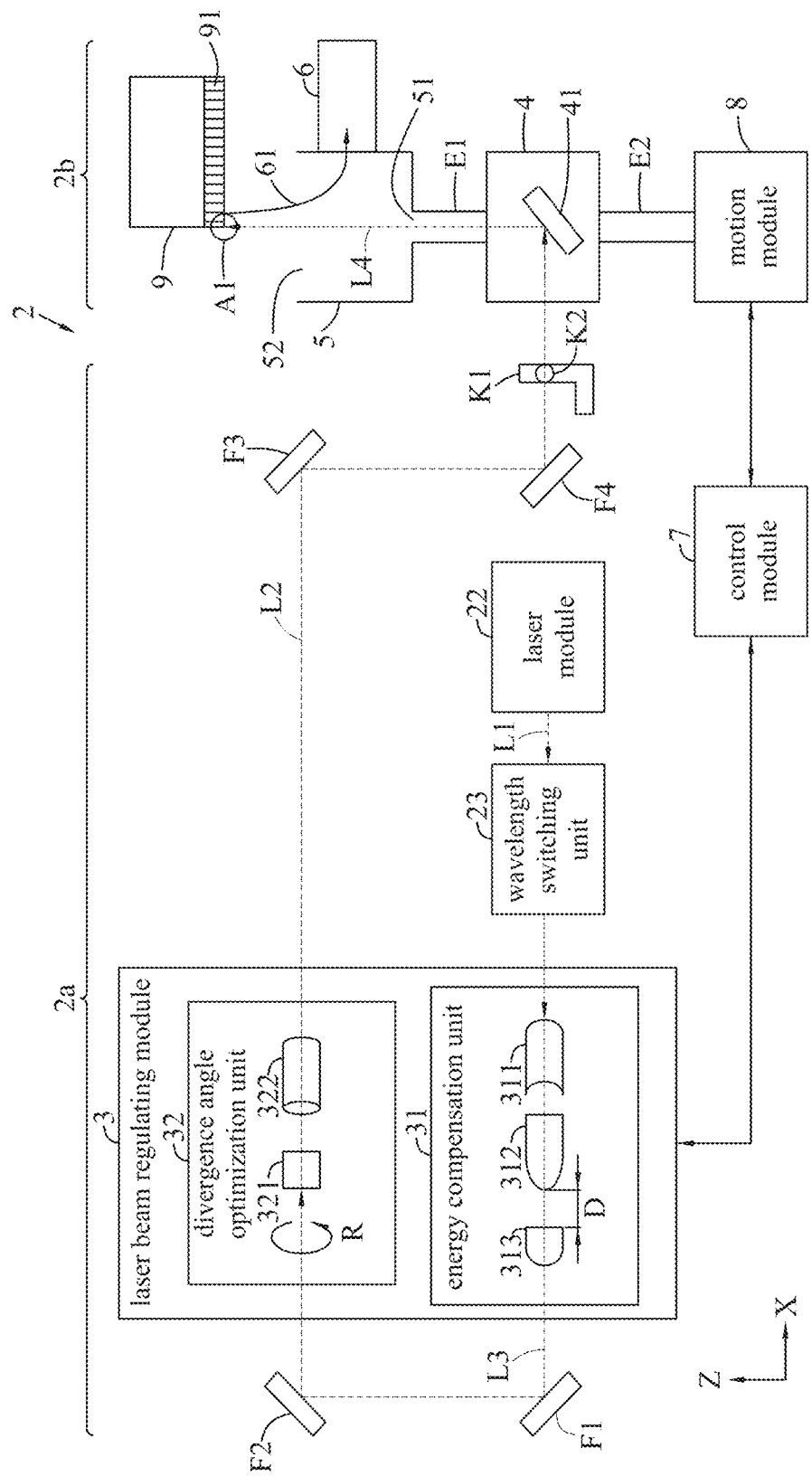
FIGS. 5A and 5B are schematic diagrams depicting a laser cleaning apparatus in accordance with a second embodiment of the present disclosure, wherein a motion module may move the optical path propagating module, a nozzle, and a stabilized laser beam to correspond to different cleaning locations of a test piece.
Figure 5B:
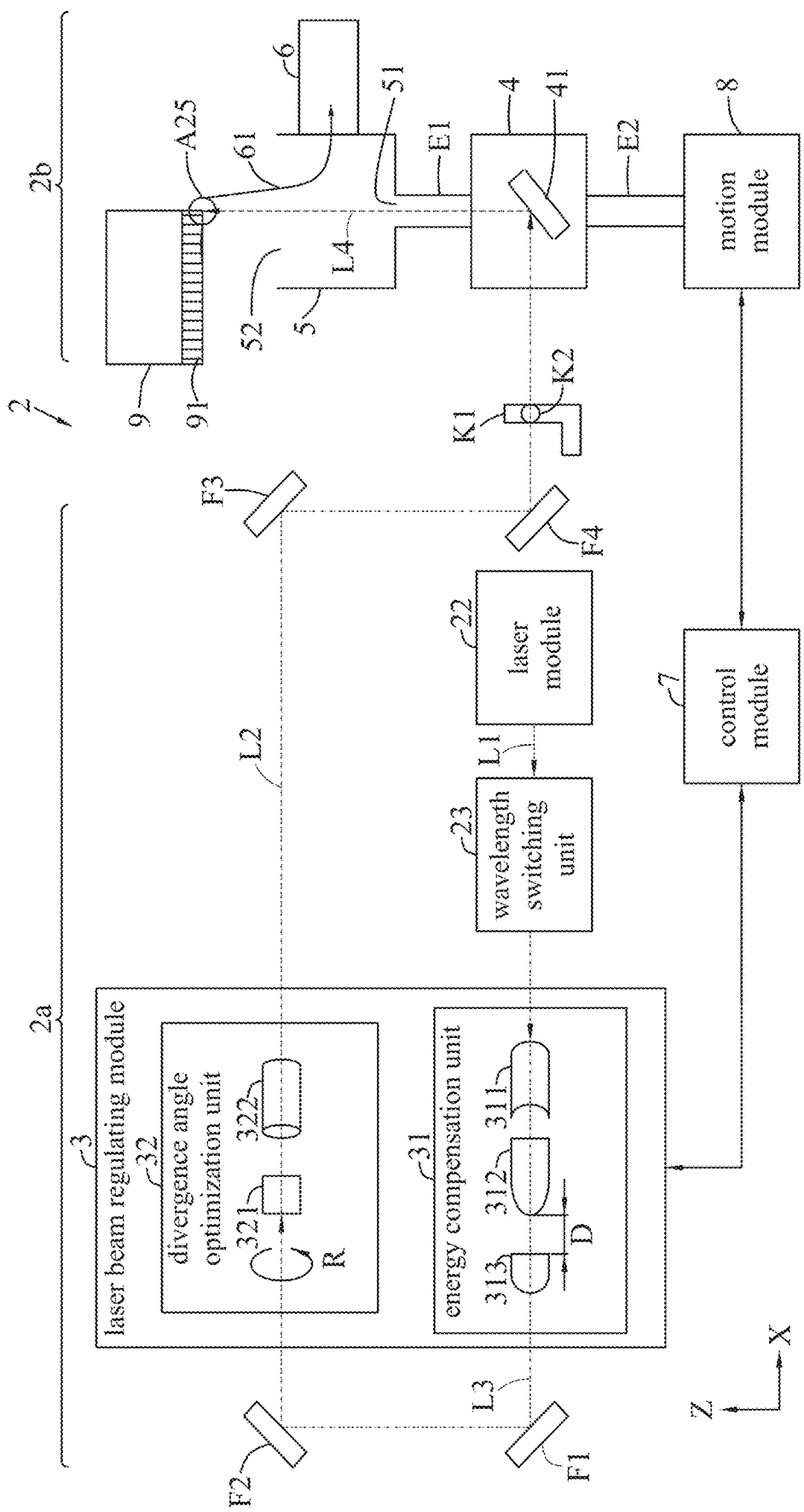

FIGS. 4A and 4B are schematic diagrams depicting the laser cleaning apparatus 2 in accordance with a first embodiment of the present disclosure. FIGS. 5A and 5B are schematic diagrams depicting the laser cleaning apparatus 2 in accordance with a second embodiment of the present disclosure. A motion module is used for moving an optical path propagating module 4, a nozzle 5 and a stabilized laser beam L4 in order to correspond to different cleaning locations (e.g., cleaning locations A1 to A25 shown in FIG. 11A) on a test piece 9.

The main difference between the first embodiment illustrated in FIGS. 4A and 4B and the second embodiment illustrated in FIGS. 5A and 5B is that in FIGS. 4A and 4B, an energy compensation unit 32 is furnished above a carrier (not shown) and a divergence angle optimization unit 31 is furnished above the energy compensation unit 32, whereas in FIGS. 5A and 5B the divergence angle optimization unit 31 is furnished above the carrier (not shown) and the energy compensation unit 32 is furnished above the divergence angle optimization unit 31. The present disclosure is now illustrated below using the embodiment shown in FIGS. 5A and 5B.

As shown in FIGS. 5A and 5B, the laser cleaning apparatus 2 is applicable to cleaning an element, for example, cleaning a test piece (e.g., probe card) 9 having a plurality of probes 91. The laser cleaning apparatus 2 includes a laser module 22, a wavelength switching unit 23, a laser beam regulating module 3, at least an optical element, at least a support, and an L-shaped plate K1 having a through hole K2 disposed in a first machine 2a. An optical path propagating module 4, a nozzle 5, a dust collecting module 6, a control module 7, and a motion module 8 are disposed in a wafer prober (a second machine 2b). The optical path propagating module 4 (such as a light guide arm) can be fixed on top of the through hole K2 of an L-shaped plate K1 in the first machine 2a, so as to propagate a laser beam L to the wafer prober (second machine 2b) for cleaning the test piece 9. The present disclosure illustrates the application of cleaning a test piece 9 (probes 91) in a wafer prober. However, the present disclosure may equally be used for cleaning specimens inside other apparatuses, and these are deemed to be within the scope of the appended claims.

The laser beam regulating module 3 may include the divergence angle optimization unit 31 including a first lens 311 (e.g., a concave lens), a second lens 312 (e.g., a convex lens), and a third lens 313 (e.g., a convex lens) and the energy compensation unit 32 having a half-wave plate 321 and a beam splitter 322. However, the first lens 311 being a concave lens and the second lens 312 and the third lens 313 being convex lens are just one example of the present disclosure; the first lens 311, the second lens 312, and the third lens 313 may adopt different types of lenses as long as optimization of divergence angle is achieved. In an embodiment, a combination of a concave lens and a convex lens can be used, or a combination of a concave lens and three convex lenses can also be used as long as a laser beam L1 can be adjusted to a collimated laser beam L3; these combinations are deemed to be within the scope of the appended claims.

In an embodiment, the at least one optical element is a reflecting mirror, and includes at least one of a first optical element F1, a second optical element F2, a third optical element F3, and a fourth optical element F4.

The two ends of the optical path propagating module 4 can be connected to the nozzle 5 and the motion module 8 via a connector E1 and a connector E2, respectively. Alternatively, the optical path propagating module 4 and the nozzle 5 can be sequentially disposed on the motion module 8. The nozzle 5 includes an opening 51 corresponding to the optical path propagating module 4 and an opening 52 corresponding to the test piece 9 (probes 91). The dust collecting module 6 includes an opening (not shown) in communication with the nozzle 5 and its opening 52. The test piece 9 and the probes 91 are kept stationary and located above the nozzle 5 and its opening 52.

As shown in FIGS. 4A and 4B, the laser module 22 may provide in a horizontal direction a laser beam L1, which passes through the energy compensation unit 32. A laser beam L2 compensated by the energy compensation unit 32 is first reflected by the first optical element F1 vertically onto the second optical element F2, and then, from there, is reflected from a vertical direction to a horizontal direction towards the divergence angle optimization unit 31. A collimated laser beam L3 optimized by the divergence angle optimization unit 31 is then reflected by the third optical element F3 from a horizontal direction to a vertically downward direction towards the fourth optical element F4, from there, the collimated laser beam L3 is further reflected from a vertical direction to a horizontal direction towards the light guide arm (the optical path propagating module 4), which then guides the laser beam into the wafer prober (the second machine 2b), thereby cleaning the test piece 9 (probes 9) by a stabilized laser beam L4.

The laser module 22 can be a laser generator, a laser emitter, etc., such as an ultra violet laser, a semiconductor green light laser, a near-infrared laser or a far-infrared laser. The optical path propagating module 4 can be an optical element (e.g., an optical lens such as a reflector), a light guide arm, an optical fiber, or any combination thereof. The nozzle 5 can be a suction nozzle, a blowing nozzle, or a suction and blowing nozzle. The opening 51 may be an aperture, a hole, or the like. The dust collection module 6 can be a dust collector, a dust collection pipe, a dust collection bag, or any combination thereof. The control module 7 can be a controller, a processor, a computer, a server, control software, or the like. The motion module 8 can be a mobile platform, a motion device, or a mobile carrier platform. However, the present disclosure is not limited thereto.

Figure 6:
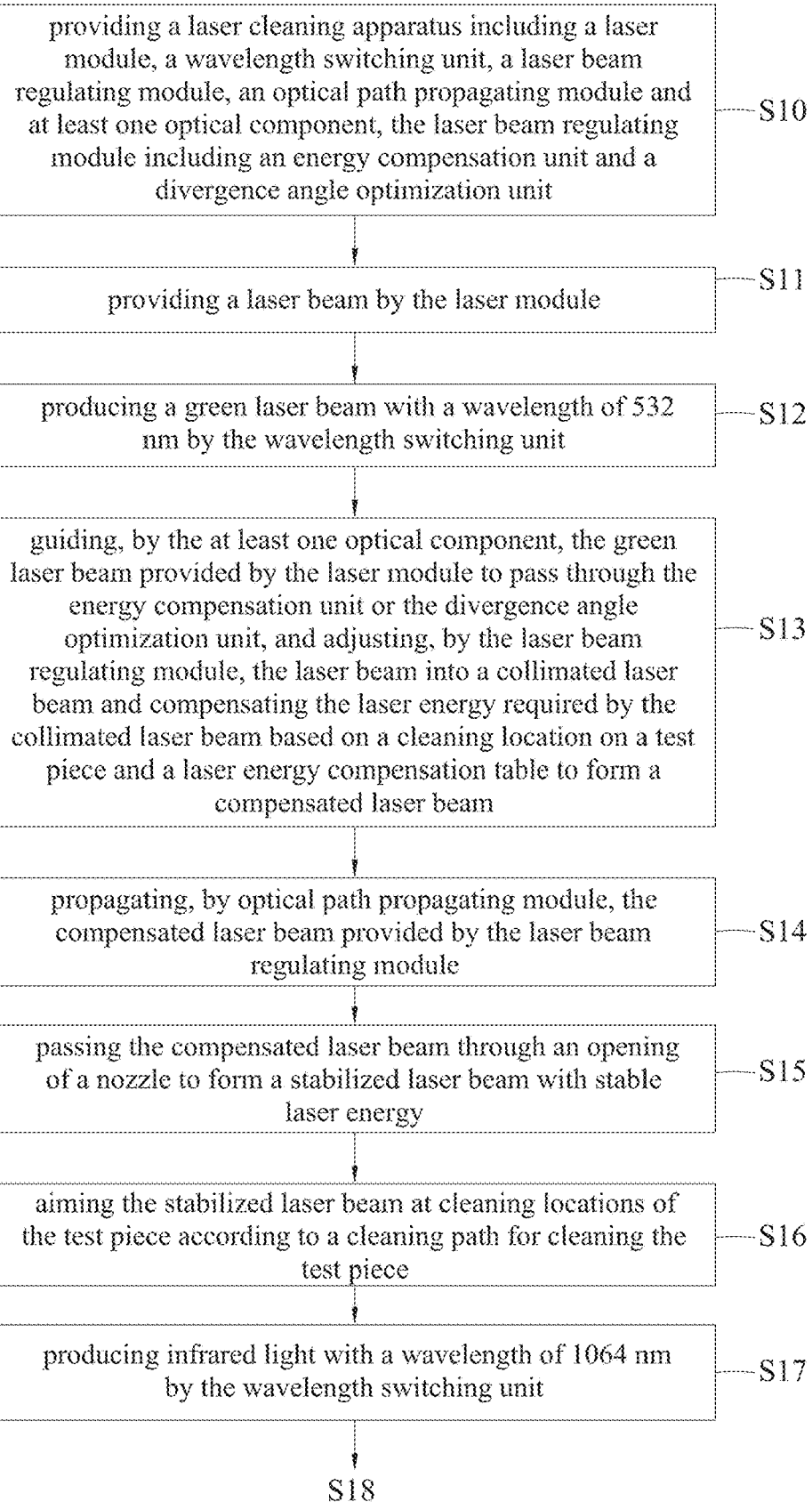
FIG. 6 is a flowchart illustrating a laser cleaning method in accordance with the present disclosure.

FIG. 6 is a flowchart illustrating a laser cleaning method in accordance with the present disclosure. Please refer to FIG. 6 in conjunction with the embodiment described with respect to FIGS. 5A and 5B. The embodiment shown in FIGS. 4A and 4B is similar to that shown in FIGS. 5A and 5B; therefore, it is no longer repeated.

As shown in step S10 of FIG. 6 and FIGS. 5A and 5B above, a laser cleaning apparatus 2 including a carrier (not shown), a laser module 22, a wavelength switching unit 23, a laser beam regulating module 3, and at least one optical element is furnished. The laser beam regulating module 3 includes an energy compensation unit 32 and a divergence angle optimization unit 31. The laser module 22, the energy compensation unit 32, and the divergence angle optimization unit 31 are all located above the carrier (not shown).

As shown in step S11 of FIG. 6 and FIGS. 5A and 5B above, a laser beam L1 is furnished by the laser module 22.

Figure 13:
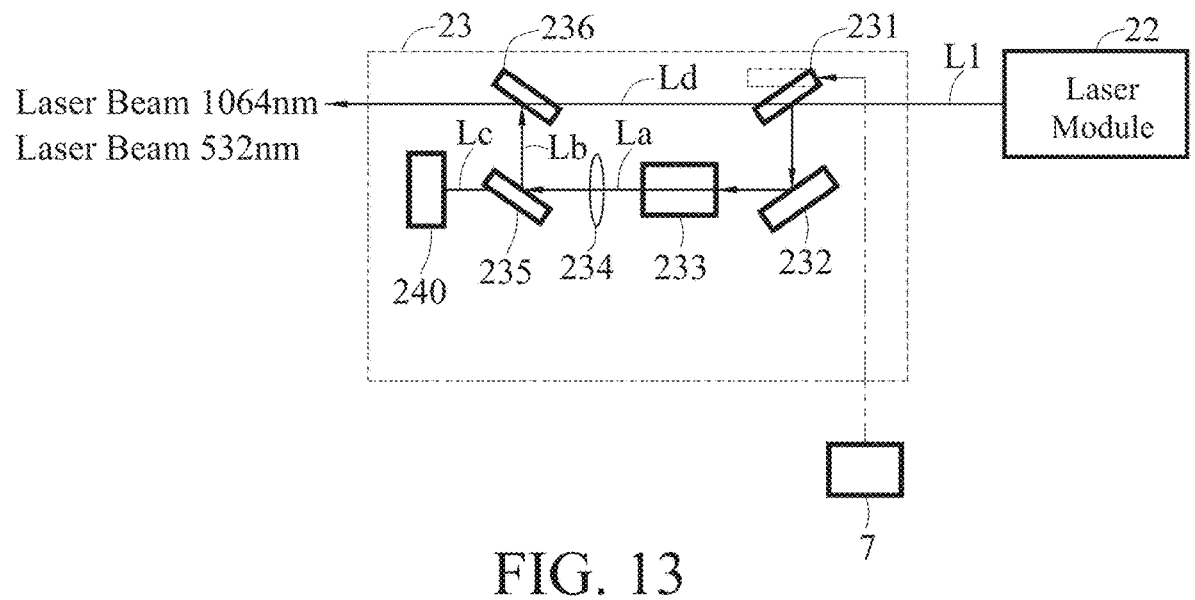
FIG. 13 is a schematic diagram depicting a wavelength switching unit for generating infrared and green laser beams in the present disclosure.

As shown in step S12 of FIG. 6 and FIGS. 5A and 5B above, a green laser output with a wavelength of 532 nm is created (switched) from the laser beam L1 by the wavelength switching unit 23. As shown in FIG. 13, the laser beam L1 furnished by the laser module 22 is reflected by a reflecting mirror 231 and a reflecting mirror 232 in the wavelength switching unit 23 to a frequency-doubling crystal 233 to generate a laser beam L1 having green light with a wavelength of 532 nm and infrared light with a wavelength of 1064 nm. It is then divergence-angle compensated by a lens 234 and passed through a beam splitter 235, forming a green laser beam Lb having a wavelength of 532 nm that is then reflected by a reflecting mirror 236 to the laser beam regulating module 3, and an infrared laser beam Lc having a wavelength of 1064 nm that is then outputted into a light recollecting device 240 to be recollected in order to prevent overheating of the wavelength switching unit 23.

As shown in step S13 of FIG. 6 and FIGS. 5A and 5B above, the laser beam L1 furnished by the laser module 22 is adjusted by the divergence angle optimization unit 31 of the laser beam regulating module 3 to become a collimated laser beam L3 (i.e., a laser beam after collimation). For example, the interval D between a second lens 312 and a third lens 313 of the divergence angle optimization unit 31 can be adjusted in order to minimize the divergence angle of the laser beam L1 furnished by the laser module 22 (see FIG. 8A) to generate the collimated laser beam L3.

Moreover, based on the cleaning location on the test piece 9, the energy required by the collimated laser beam L3 is compensated by the energy compensation unit 32 of the laser beam regulating module 3 to create a compensated laser beam L2. For example, based on the different cleaning locations of the test piece 9 and a laser energy compensation table (see FIG. 11C), a half-wave plate 321 of the energy compensation unit 32 is rotated to a desired angle. With the half-wave plate 321 rotated to the desired angle and a beam splitter 322, the laser energy required by the collimated laser beam L3 can be compensated to form the compensated laser beam L2 (i.e., a laser beam after compensation).

The laser beam regulating module 3 can be controlled by a control module 7, such that the laser energy required by the collimated laser beam L3 can be compensated by the laser beam regulating module 3 based on different locations on the test piece 9.

As shown in step S14 of FIG. 6 and FIGS. 5A and 5B above, the laser beam L2 compensated by the laser beam regulating module 3 is then propagated by the optical path propagating module 4.

As shown in step S15 of FIG. 6 and FIGS. 5A and 5B above, a stabilized laser beam L4 having a stable laser energy (e.g., 451 mJ) is formed by passing the compensated laser beam L2 propagated by the optical path propagating module 4 through an opening 51 of a nozzle 5. The diameter of the opening 51 of the nozzle 5 may be smaller than or equal to the diameter of the compensated laser beam L2 propagated by the optical path propagating module 4, so that the stabilized laser beam L4 may have a stable laser energy (or laser energy density). The pattern of the stabilized laser beam L4 may be, for example, a circular pattern, a square pattern, a pattern with closed areas, or a pattern with various shapes, and with a size between 0.1 mm and 100 mm.

As shown in step S16 of FIG. 6 and FIGS. 5A and 5B above, the stabilized laser beam L4 is positioned so that it corresponds to a specific cleaning location of the test piece 9 in order to perform cleaning of a probe 91 on the test piece 9. For example, a motion module 8 is controlled by the control module 7 to move the optical path propagating module 4, the nozzle 5 and its opening 51, thereby moving the stabilized laser beam L4 along a cleaning path composed of several cleaning locations on the test piece 9 (e.g., cleaning locations A1 to A25 shown in FIG. 11A), such that dirt layers containing tin (Sn) at the tips of these probes 91 can be sequentially removed. The cleaning path may be, for example, sequentially composed of probes 91 at cleaning locations A1, A2, . . . , A24, A25 on the test piece 9 shown in FIG. 11A; however, the present disclosure is not limited as such.

As shown in step S17 of FIG. 6 and FIGS. 5A and 5B above, the angle of the reflecting mirror 231 in the wavelength switching unit 23 is adjusted or switched, such that the laser beam L1 from the laser module 22 passes under the reflecting mirror 231, and an infrared laser beam Ld with a wavelength of 1064 nm is outputted to the laser beam regulating module 3, as shown in the wavelength switching unit 23 of FIG. 23. The elements and the method described in steps S18 to S22 of FIG. 6 are the same as those in steps S11, S13 to S16 above, and thus will be not be repeated.

Figure 14:
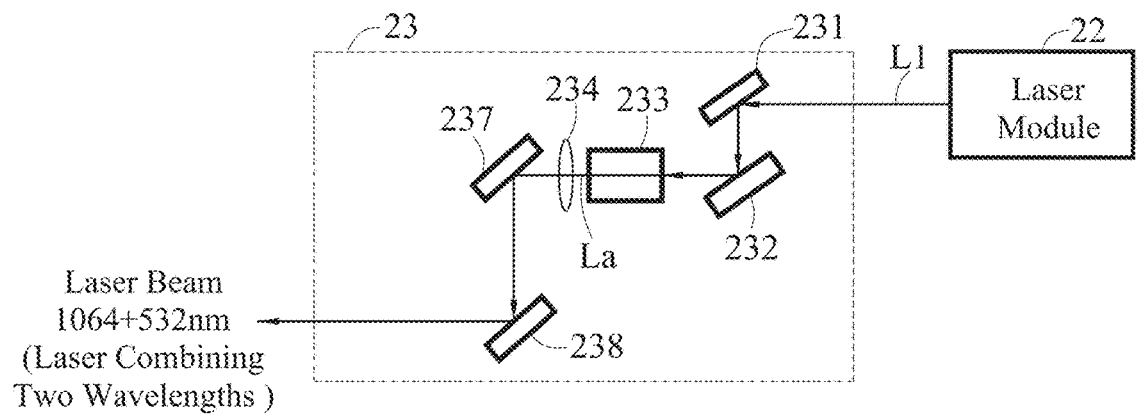
FIG. 14 is a schematic diagram depicting a wavelength switching unit for generating a laser beam combining both infrared and green wavelengths in the present disclosure.

Another embodiment of the wavelength switching unit 23 is shown in FIG. 14, which is different from the wavelength switching unit 23 shown in FIG. 13 in the following manner. The laser beam L1 from the laser module 22 is reflected by the reflecting mirror 232 in the wavelength switching unit 23 of FIG. 13, and the dirt layers containing tin (Sn) at the tips of the probes 91 (the test piece 9) are cleaned first with the green laser beam Lb with a wavelength of 532 nm adjusted/switched from the laser beam L1, and then the dirt layers containing tin oxide ($SnO_2$) at the tips of the probes 91 (the test piece 9) are cleaned in a second pass with the infrared laser beam Ld with a wavelength of 1064 nm adjusted/switched from the laser beam L1, whereas in the wavelength switching unit 23 shown in FIG. 14, a laser beam L1 having a green light with a wavelength of 532 nm and an infrared light with a wavelength of 1064 nm is generated through the reflecting mirror 233, and the laser beam L1 is divergence-angle compensated by a lens 234 before being reflected and outputted via a reflecting mirror 237 and a reflecting mirror 238 to the laser beam regulating module 3, such that the dirt layers containing tin (Sn) and tin oxide ($SnO_2$) at the tips of the probes 91 (the test piece 9) are cleaned in one go.

Moreover, dust or debris generated during cleaning of the probes 91 of the test piece 9 by the stabilized laser beam L4 can be collected along a direction 61 by the dust collecting module 6.

Figure 8A:
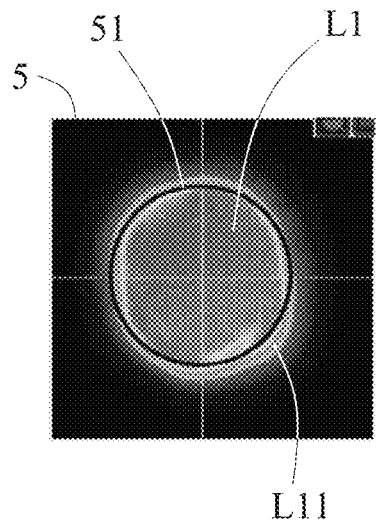
FIGS. 8A and 8B are schematic diagrams showing laser beams at an opening of a nozzle when a laser beam is propagated to a proximal end and a distal end on a test piece, respectively, before laser energy required by the laser beams is compensated by a laser beam regulating module according to the present disclosure.
Figure 8B:
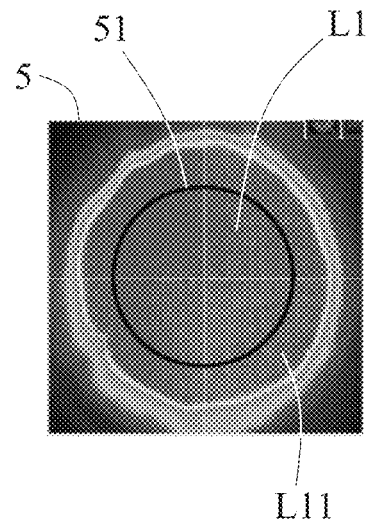
Figure 9A:
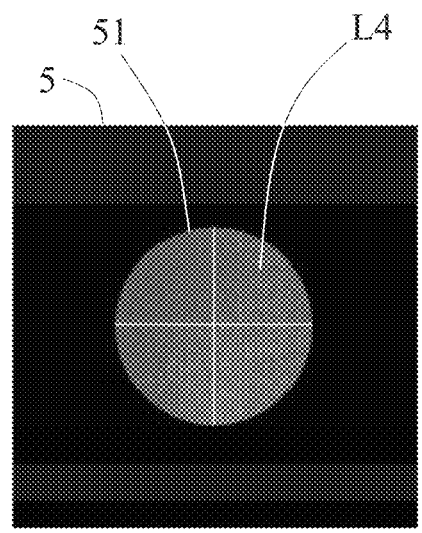
FIGS. 9A and 9B are schematic diagrams showing laser beams at an opening of a nozzle when a laser beam is propagated to a proximal end and a distal end on a test piece, respectively, after laser energy required by the laser beams is compensated by a laser beam regulating module according to the present disclosure.
Figure 9B:
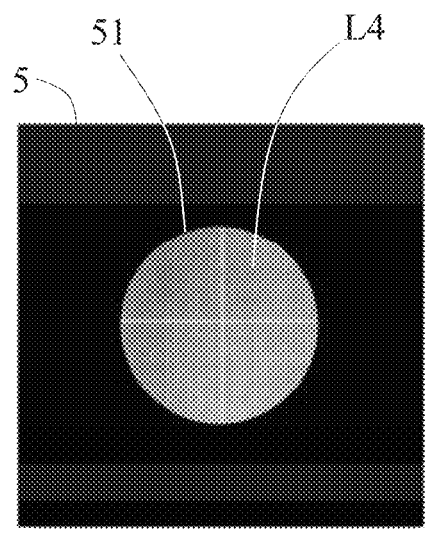

FIG. 7 is a table showing comparison of data associated with the stabilized laser beam L4 being propagated to a proximal end (e.g., cleaning location A1) versus to a distal end (e.g., cleaning location A25). FIGS. 8A and 8B are schematic diagrams showing the stabilized laser beam L4 at the opening 51 of the nozzle 5 when the collimated laser beam L3 is propagated to a proximal end and a distal end on the test piece 9, respectively, before the laser energy required by the collimated laser beam L3 is compensated by the laser beam regulating module 3 according to the present disclosure. FIGS. 9A and 9B are schematic diagrams showing the stabilized laser beam L4 at the opening 51 of the nozzle 5 when the collimated laser beam L3 is propagated to a proximal end and a distal end on the test piece 9, respectively, after the energy required by the collimated laser beam L3 is compensated by the laser beam regulating module 3 according to the present disclosure.

As shown in FIG. 7 and FIGS. 5A and 5B above, when the stabilized laser beam L4 is propagated to a proximal end (e.g., a probe 91 at cleaning location A1) on the test piece 9, the optical path of the stabilized laser beam L4 is shorter (e.g., 1034 mm), and the size of the stabilized laser beam L4 is smaller (e.g., 12.5 mm). On the other hand, when the stabilized laser beam L4 is propagated to a distal end (e.g., a probe 91 at cleaning location A25) on the test piece 9, the optical path of the stabilized laser beam L4 is longer (e.g., 1194 mm), and the size of the stabilized laser beam L4 is larger (e.g., 15 mm). Therefore, there is a difference of 160 mm between the optical paths of the stabilized laser beams L4 for a proximal end and a distal end of the test piece 9, resulting in variation in the cleaning quality of the stabilized laser beam L4 at different cleaning locations on the test piece 9. As a result, the laser energy required by the collimated laser beam L3 needs to be compensated.

As shown in FIGS. 7, 8A, and 5A above, with a fixed size (e.g., 12 mm) of the opening 51 of the nozzle 5, before the laser energy required by the collimated laser beam L3 is compensated by the laser beam regulating module 3 according to the present disclosure, in the case of the stabilized laser beam L4 being propagated to a proximal end (e.g., the probe 91 at the cleaning location A1) of the test piece 9, the area of the stabilized laser beam L4 being masked by the nozzle 5 is smaller (e.g., the outer ring L11 of the stabilized laser beam L4 is about 0.5 mm), and the laser energy on the test piece 9 before compensation is greater. Thus, as shown in FIG. 9A, after the laser energy required by the collimated laser beam L3 is compensated by the laser beam regulating module 3 in FIG. 5A according to the present disclosure, and as the stabilized laser beam L4 is being propagated to a proximal end of the test piece 9, the energy of the stabilized laser beam L4 at the opening 51 of the nozzle 5 is stable (e.g., 452 mJ).

As shown in FIGS. 7, 8B, and 5B above, with a fixed size (e.g., 12 mm) of the opening 51 of the nozzle 5, before the laser energy required by the collimated laser beam L3 is compensated by the laser beam regulating module 3 according to the present disclosure, in the case of the stabilized laser beam L4 being propagated to a distal end (e.g., the probe 91 at the cleaning location A25) of the test piece 9, the area of the stabilized laser beam L4 being masked by the nozzle 5 is larger (e.g., the outer ring L11 of the stabilized laser beam L4 is about 3 mm), and the laser energy on the test piece 9 before compensation is smaller. Thus, as shown in FIG. 9B, after the laser energy required by the collimated laser beam L3 is compensated by the laser beam regulating module 3 in FIG. 5B according to the present disclosure, and as the stabilized laser beam L4 is being propagated to a distal end of the test piece 9, the energy of the stabilized laser beam L4 at the opening 51 of the nozzle 5 is also stable (e.g., 451 mJ).

Figure 10:
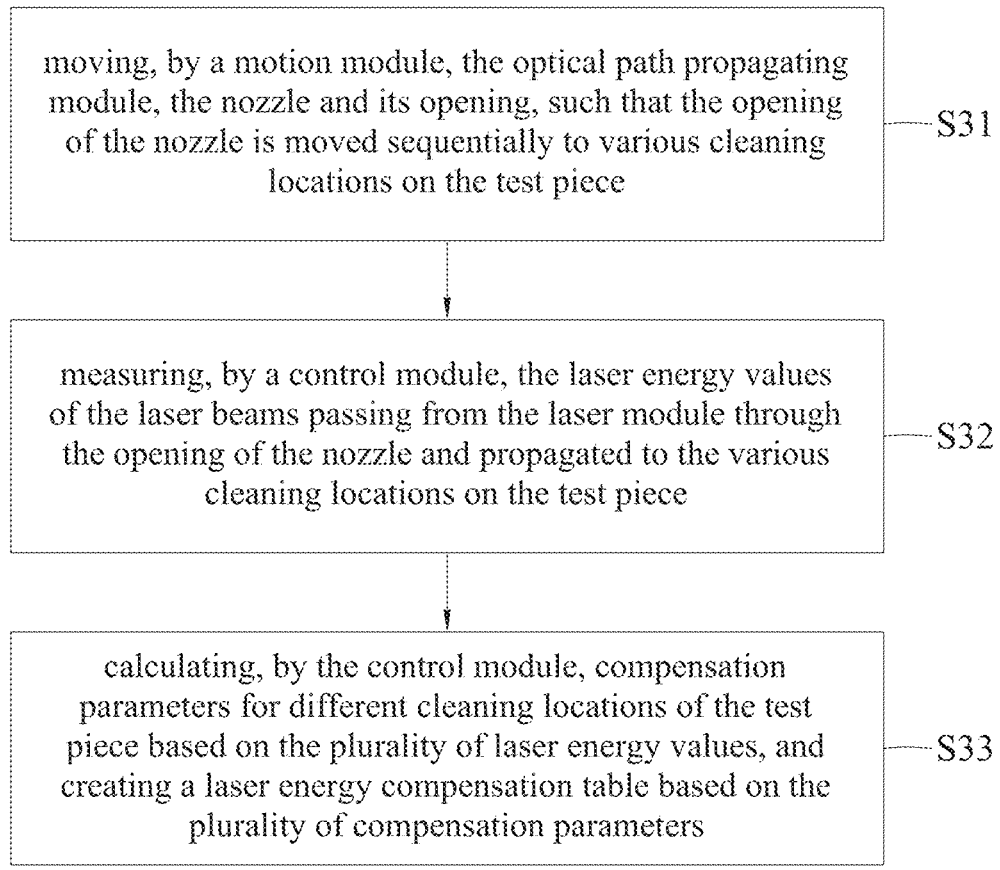
FIG. 10 is a flowchart illustrating a calibration process related to laser energy in a laser cleaning method in accordance with the present disclosure.

FIG. 10 is a flowchart illustrating a calibration process related to laser energy in the laser cleaning method in accordance with the present disclosure. FIG. 11A is a location table including a plurality of cleaning locations (A1-A25) of a test piece 9 in the laser cleaning apparatus 2 shown in FIGS. 5A and 5B. FIG. 11B is a laser energy table including a plurality of laser energy values generated by the control module 7 according to the present disclosure measuring the laser energy at the various locations of FIG. 11A.

As shown in step S31 of FIG. 10, FIG. 11A and FIGS. 5A and 5B, the optical path propagating module 4, the nozzle 5, and its opening 51 are moved by a motion module 8, such that the opening 51 of the nozzle 5 is moved sequentially to various cleaning locations (e.g., A1 to A25) on the test piece 9.

As shown in step S32 of FIG. 10, FIG. 11A and FIGS. 5A and 5B, laser energy values of the laser beams L1 passed from the laser module 22 through the opening 51 of the nozzle 5 and propagated to the various cleaning locations (e.g., A1 to A25) on the test piece 9 (probes 91) are measured by a control module 7. For example, the laser energy value at the cleaning location A1 is 452 mJ, while the laser energy value at the cleaning location A25 is 420 mJ, As shown in step S33 of FIG. 10, FIG. 11A and FIGS. 5A and 5B, compensation parameters (or compensation parameter percentages) for different cleaning locations of the test piece 9 are calculated by the control module 7 based on the plurality of laser energy values in FIG. 11B, and a laser energy compensation table is created based on the plurality of compensation parameters (or compensation parameter percentages). For example, the compensation parameter (or the compensation parameter percentage) at the cleaning location A1 is 0.00%, while the compensation parameter (or the compensation parameter percentage) at the cleaning location A25 is 7.08%.

Figure 12A:
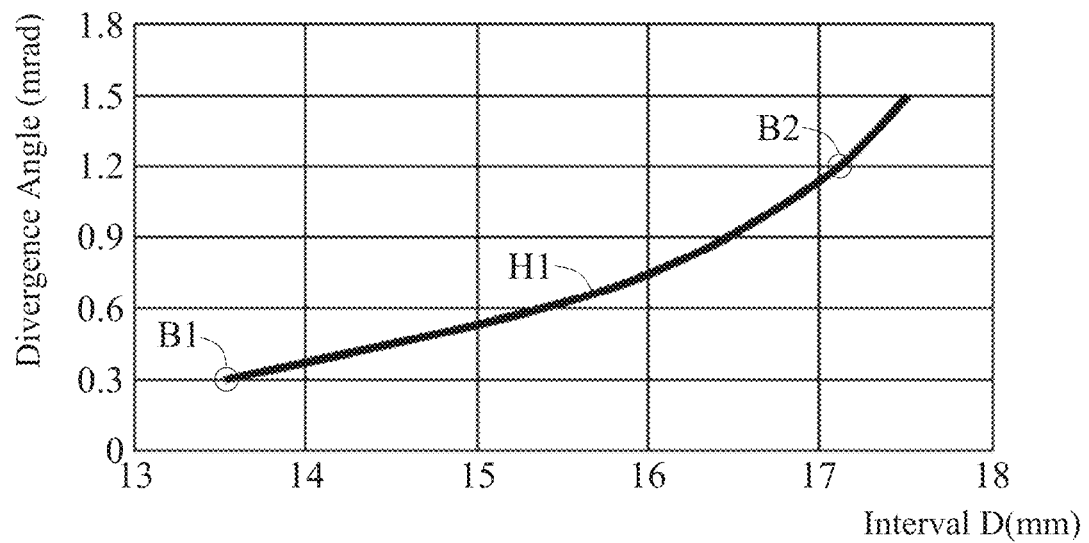
FIG. 12A is a graph depicting the relationship between divergence angle and interval with respect to a divergence angle optimization unit for optimizing the divergence angle of the laser beam in a laser beam regulating module of FIGS. 5A and 5B.

FIG. 12A is a graph depicting the relationship between divergence angle and interval with respect to the divergence angle optimization unit 31 for optimizing the divergence angle of the laser beam L1 in the laser beam regulating module 3 of FIGS. 5A and 5B.

As shown in FIG. 12A and FIGS. 5A and 5B, the interval D between the second lens 312 and the third lens 313 in the divergence angle optimization unit 31 of the laser beam regulating module 3 can be adjusted to minimize the divergence angle of the laser beam L1 furnished by the laser module 22. For example, the divergence angle of the laser beam L1 is reduced from a location B2 (with a divergence angle of 1.2 mrad) on a curve H1 to a location B1 (with a divergence angle of 0.3 mrad), such that the collimated laser beam L3 can be generated, thereby reducing the laser energy compensation for the collimated laser beam L3 by the energy compensation unit 32, and also reducing the response time for the energy compensation unit 32 in compensating the laser energy required by the collimated laser beam L3.

Figure 12B:
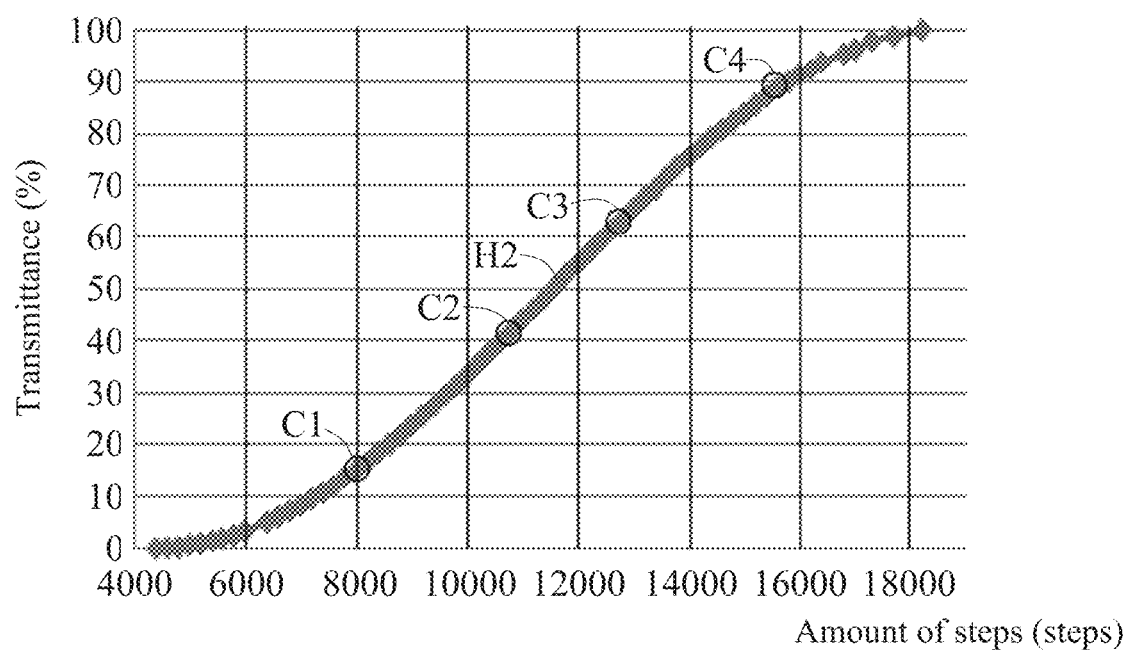
FIG. 12B is a graph depicting the relationship between transmittance and the amount of steps in relation to an energy compensation unit compensating the laser energy required by a collimated laser beam in the laser beam regulating module of FIGS. 5A and 5B.

FIG. 12B is a graph depicting the relationship between transmittance and the amount of steps in relation to the energy compensation unit 32 compensating the laser energy required by the collimated laser beam L3 in the laser beam regulating module of FIGS. 5A and 5B.

As shown in FIG. 12B and FIGS. 5A and 5B above, after the divergence angle optimization unit 31 has minimized the divergence angle of the laser beam L1 furnished by the laser module 22 to generate the collimated laser beam L3, the energy compensation unit 32 is capable of reducing the compensation parameter for the laser energy required by the collimated laser beam L3 and reducing the response time for compensating the laser energy required by the collimated laser beam L3.

For example, when the half-wave plate 321 is rotated by a motor (e.g., a stepper motor; not shown) in a rotation direction R, the amount of steps of the motor can be reduced from a larger range (about 8000 steps (location C1 on a curve H2) to about 15,500 steps (location C4)) to a smaller range (about 11,800 steps (location C2) to about 12,800 steps (location C3)). Also, the transmittance of the collimated laser beam L3 passing through the half-wave plate 321 and the beam splitter 322 of the energy compensation unit 32 can be reduced from a larger range (about 15% (location C1) to about 90% (location C4)) to a smaller range (about 40% (location C2) to about 65% (location C3). Therefore, the present disclosure is capable of reducing the range of the amount of steps of the motor in order to reduce the time it takes for the motor to rotate the half-wave plate 321, and also reducing the range of transmittance of the collimated laser beam L3 passing through the half-wave plate 321 and the beam splitter 322, thereby increasing the response of the energy compensation unit 32 in compensating the laser energy required by the collimated laser beam L3.

Figure 15:
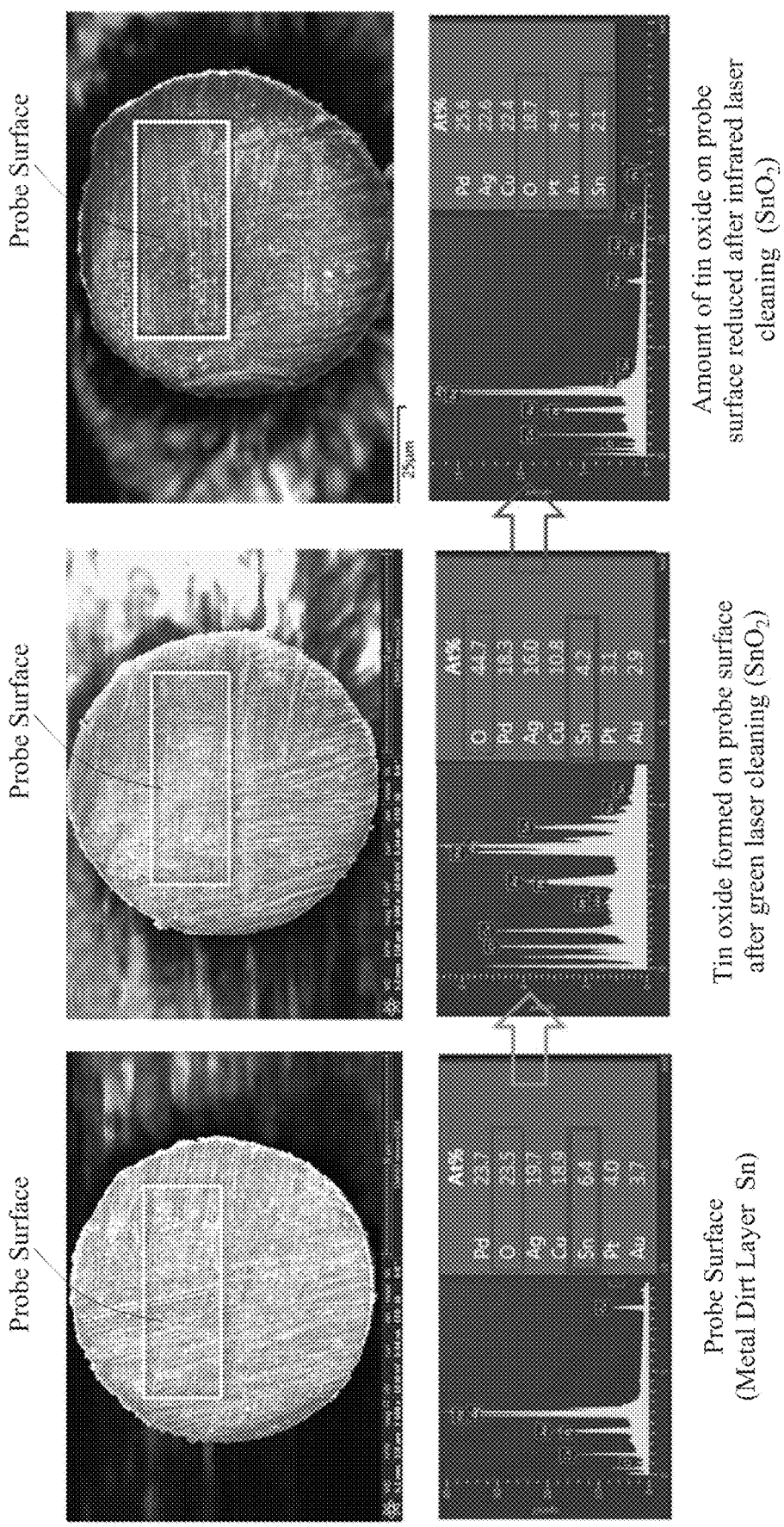
FIG. 15 shows images before and after cleaning a probe of a test piece with a green laser beam and subsequently with an infrared laser beam in accordance with the present disclosure.
Figure 16:
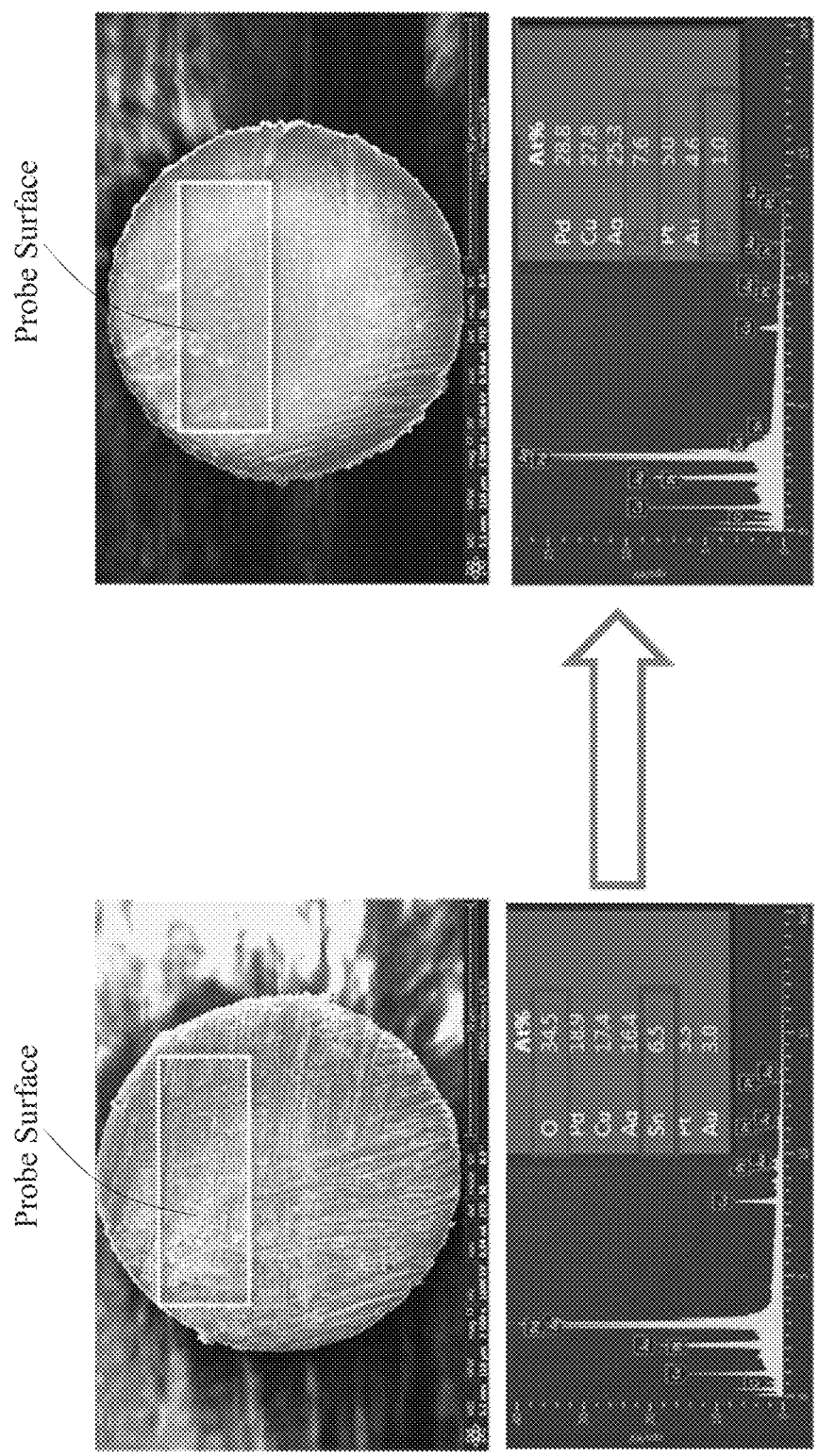
FIG. 16 shows images before and after cleaning a probe of a test piece with a laser beam combining both infrared and green wavelengths in accordance with the present disclosure.

FIG. 15 shows images before and after cleaning a probe 91 on a test piece 9 in two passes with a green laser beam (wavelength of 532 nm) and subsequently with an infrared laser beam (wavelength of 1064 nm) switched by the wavelength switching unit 23 of FIG. 13. FIG. 16 shows images before and after cleaning a probe 91 on a test piece 9 in one pass with a laser beam including green light (wavelength of 532 nm) and infrared light (wavelength of 1064 nm) furnished by the wavelength switching unit 23 of FIG. 13. As can be seen in both cases, the results after cleaning were significantly improved as hardly any black residues remained.

It can be understood from the above, the present disclosure is capable of compensating the laser energy required by the collimated laser beam based on different cleaning locations of the test piece (probe card) or its probes and having the collimated laser beam L3 pass through the opening of the nozzle to form a stabilized laser beam L4 with a stable laser energy. Accordingly, the present disclosure achieves total laser cleaning of the test piece (probe card) and reduces or eliminates the residues on the test piece (probe card) by using stabilized laser beams of two kinds of wavelengths and energy for cleaning the various locations of the probe card, thereby improving the cleaning quality of the laser beams on the test piece (probe card).

The divergence angle optimization unit of the laser beam regulating module according to the present disclosure is capable of minimizing the divergence angle of the laser beam furnished by the laser module, thereby reducing the compensation of the laser energy for the collimated laser beam by the energy compensation unit while increasing the response of the energy compensation unit in compensating the laser energy required by the collimated laser beam.

The above embodiments are used only to illustrate the principles of the present disclosure and its effect, rather than to limit the present disclosure. The above embodiments can be modified by one of ordinary skill in the art without departing from the spirit and scope of the present disclosure. Therefore, the scope claimed of the present disclosure should be defined by the following claims.

What is claimed is:

1. A laser cleaning apparatus for cleaning a test piece, comprising:
a laser module for providing a laser beam;
a laser beam regulating module including an energy compensator and a divergence angle optimizer, wherein the divergence angle optimizer is configured for adjusting the laser beam into a collimated laser beam, and the energy compensator is configured for compensating laser energy required by the laser beam based on a cleaning location of the test piece to form a compensated laser beam;
a wavelength switcher for switching a wavelength of the laser beam in accordance with process requirements;
at least an optical element for guiding the laser beam provided by the laser module to pass through at least one of the energy compensator and the divergence angle optimizer; and
an optical path propagating module and a nozzle with an opening disposed in a machine, wherein
the optical path propagating module is connected with a light guide arm for guiding the laser beam to pass through the opening of the nozzle to form a stabilized laser beam with a stable laser energy that aims at the cleaning location of the test piece inside a wafer prober for cleaning the test piece.

2. The laser cleaning apparatus of claim 1, wherein the wavelength switcher includes at least one reflecting mirror and a double-frequency crystal.

3. The laser cleaning apparatus of claim 2, further comprising a beam splitter, wherein the double-frequency crystal generates a laser beam containing green light with a wavelength of 532 nm and infrared light with a wavelength of 1064 nm, and the beam splitter generates a green laser beam with a wavelength of 532 nm to be outputted to the laser beam regulating module for cleaning dirty layers containing tin (Sn) at tips of probes on the test piece in a first pass.

4. The laser cleaning apparatus of claim 1, wherein the wavelength switcher switches an angle of a reflecting mirror therein, such that the laser beam generated by the laser module passes under the reflecting mirror, and an infrared laser beam with a wavelength of 1064 nm is outputted to the laser beam regulating module for cleaning dirt layers containing an oxide layer ($SnO_2$) at tips of probes on the test piece in a second pass.

5. The laser cleaning apparatus of claim 1, further comprising a double-frequency crystal and a reflecting mirror, wherein the wavelength switcher generates a laser beam containing green light with a wavelength of 532 nm and infrared light with a wavelength of 1064 nm via the double-frequency crystal and outputs the laser beam through the reflecting mirror to the laser beam regulating module for cleaning dirt layers containing tin (Sn) and an oxide layer ($SnO_2$) at tips of probes on the test piece in one go.

6. The laser cleaning apparatus of claim 1, wherein the laser module, the laser beam regulating module, and the optical element are disposed in another machine.

7. The laser cleaning apparatus of claim 1, wherein the laser module, the energy compensator, and the divergence angle optimizer are disposed at different heights.

8. The laser cleaning apparatus of claim 1, wherein the divergence angle optimizer is configured for reducing a divergence angle of the laser beam to generate the collimated laser beam.

9. The laser cleaning apparatus of claim 1, wherein the divergence angle optimizer includes a first lens, a second lens, and a third lens.

10. The laser cleaning apparatus of claim 9, wherein the first lens is a concave lens, and the second and third lenses are convex lenses.

11. The laser cleaning apparatus of claim 9, wherein the divergence angle optimizer reduces a divergence angle of the laser beam to generate the collimated laser beam by adjusting an interval between the second and third lenses.

12. The laser cleaning apparatus of claim 1, wherein the energy compensator includes a half-wave plate and a beam splitter, the half-wave plate is rotated to a desired angle based on different cleaning locations of the test piece, and the compensated laser beam is formed by compensating the laser energy through rotating the half-wave plate to a desired angle and the beam splitter.

13. The laser cleaning apparatus of claim 1, wherein the light guide arm is fixed on a through hole of an L-shaped plate for propagating the laser beam from at least one of the energy compensator and the divergence angle optimizer so as to clean the test piece using the laser beam.

14. The laser cleaning apparatus of claim 1, wherein the optical element includes a first optical element, a second optical element, a third optical element, and a fourth optical element.

15. The laser cleaning apparatus of claim 14, wherein the first optical element turns the laser beam passed through the energy compensator or the divergence angle optimizer from a horizontal direction to a vertically upward direction towards the second optical element, the second optical element turns the laser beam from a vertical direction to a horizontal direction towards the divergence angle optimizer or the energy compensator, the third optical element turns the laser beam passed through the divergence angle optimizer or the energy compensator from a horizontal direction to a vertically downward direction towards the fourth optical element, and the fourth optical element then turns the laser beam from a vertical direction to a horizontal direction towards the light guide arm.

16. The laser cleaning apparatus of claim 1, wherein the divergence angle optimizer is disposed above the energy compensator.

17. The laser cleaning apparatus of claim 1, wherein the energy compensator is disposed above the divergence angle optimizer.

18. The laser cleaning apparatus of claim 1, wherein the energy compensator and the divergence angle optimizer are disposed above the laser module.

19. The laser cleaning apparatus of claim 1, further comprising a control module, a motion module, and a dust collecting module, wherein the optical path propagating module, the nozzle with the opening, the control module, the motion module, and the dust collecting module are disposed within the wafer prober.

20. The laser cleaning apparatus of claim 1, further comprising a control module for controlling the laser beam regulating module to compensate the laser energy required by the laser beam based on different cleaning locations of the test piece.

21. The laser cleaning apparatus of claim 20, further comprising a motion module controlled by the control module for moving the optical path propagating module and the nozzle with an opening so as to move the stabilized laser beam along a cleaning path including a plurality of cleaning locations on the test piece in order to clean a plurality of probes on the test piece.

22. The laser cleaning apparatus of claim 1, further comprising a dust collecting module for collecting dust or debris generated during cleaning of the test piece by the laser beam.

23. The laser cleaning apparatus of claim 1, further comprising a control module for measuring laser energy on a plurality of cleaning locations on the test piece to create a laser energy table including a plurality of laser energy values.

24. The laser cleaning apparatus of claim 23, wherein the control module further creates a laser energy compensation table including a plurality of compensation parameters based on the laser energy table.

25. A laser cleaning method for cleaning a test piece, comprising:
providing a laser cleaning apparatus including
a laser module,
a wavelength switching unit,
a laser beam regulating module including an energy compensation unit and a divergence angle optimization unit, and
at least one optical element;
providing a laser beam through the laser module;
adjusting the wavelength switching unit to allow the laser beam to pass through a double-frequency crystal to generate a laser beam containing green light with a wavelength of 532 nm and infrared light with a wavelength of 1064 nm, and to then pass through a beam splitter to generate a green laser beam with a wavelength of 532 nm to be outputted to the laser beam regulating module;
guiding the green laser beam provided by the laser module through the optical element to pass through at least one of the energy compensation unit and the divergence angle optimization unit;
propagating the green laser beam from the at least one of the energy compensation unit and the divergence angle optimization unit by an optical path propagating module and performing a first cleaning process to clean dirty layers containing tin (Sn) at tips of probes on the test piece;
adjusting an angle of a reflecting mirror in the wavelength switching unit to allow the laser beam of the laser module to pass underneath the reflecting mirror, and outputting an infrared laser beam with a wavelength of 1064 nm into the laser beam regulating module;
guiding the infrared laser beam provided by the laser module through the optical element to pass through at least one of the energy compensation unit and the divergence angle optimization unit; and
propagating the infrared laser beam from the at least one of the energy compensation unit and the divergence angle optimization unit by the optical path propagating module and performing the first cleaning process to clean the dirty layers containing tin oxide ($SnO_2$) at the tips of the probes.

26. The laser cleaning method of claim 25, further comprising adjusting the laser beam into a collimated laser beam by the divergence angle optimization unit, and compensating, by the energy compensation unit, a laser energy required by the laser beam based on a cleaning location of the test piece to form a compensated laser beam.

27. The laser cleaning method of claim 25, wherein the divergence angle optimization unit reduces a divergence angle of the laser beam furnished by the laser module to generate a collimated laser beam.

28. The laser cleaning method of claim 25, further comprising rotating a half-wave plate of the energy compensation unit to a desired angle based on different cleaning locations of the test piece, wherein the compensated laser beam is formed by compensating the laser energy through rotating the half-wave plate to the desired angle and a beam splitter of the energy compensation unit.

29. The laser cleaning method of claim 25, further comprising passing the laser beam propagated by the optical path propagating module through an opening of a nozzle to form a stabilized laser beam with a stable laser energy that aims at a cleaning location of the test piece for cleaning the test piece.

30. The laser cleaning method of claim 29, further comprising moving the stabilized laser beam along a cleaning path including a plurality of cleaning locations on the test piece in order to clean the probes on the test piece.

31. The laser cleaning method of claim 25, further comprising collecting dust or debris generated during cleaning of the test piece by the laser beam.

32. The laser cleaning method of claim 25, further comprising creating a laser energy compensation table including a plurality of compensation parameters based on a plurality of cleaning locations of the test piece.

33. A laser cleaning method for cleaning a test piece, comprising:
providing a laser cleaning apparatus including
a laser module,
a wavelength switching unit,
a laser beam regulating module including an energy compensation unit and a divergence angle optimization unit, and
at least one optical element;
providing a laser beam through the laser module;
adjusting the wavelength switching unit to allow the laser beam to pass through a double-frequency crystal to generate a laser beam containing green light with a wavelength of 532 nm and infrared light with a wavelength of 1064 nm, which then passes through a reflecting mirror to be outputted to the laser beam regulating module;
guiding the laser beam with green light and infrared light provided by the laser module through the optical element to pass through at least one of the energy compensation unit and the divergence angle optimization unit; and
propagating the laser beam with green light and infrared light from the at least one of the energy compensation unit and the divergence angle optimization unit by an optical path propagating module and performing a cleaning process to clean dirty layers containing tin (Sn) and an oxide layer ($SnO_2$) at tips of probes of the test piece.

34. The laser cleaning method of claim 33, further comprising adjusting the laser beam into a collimated laser beam by the divergence angle optimization unit, and compensating, by the energy compensation unit, a laser energy required by the laser beam based on a cleaning location of the test piece to form a compensated laser beam.

35. The laser cleaning method of claim 33, wherein the divergence angle optimization unit reduces a divergence angle of the laser beam furnished by the laser module to generate a collimated laser beam.

36. The laser cleaning method of claim 33, further comprising rotating a half-wave plate of the energy compensation unit to a desired angle based on different cleaning locations of the test piece, and the compensated laser beam is formed by compensating the laser energy through rotating the half-wave plate to the desired angle and a beam splitter of the energy compensation unit.

37. The laser cleaning method of claim 33, further comprising passing the laser beam propagated by the optical path propagating module through an opening of a nozzle to form a stabilized laser beam with a stable laser energy that aims at a cleaning location of the test piece for cleaning the test piece.

38. The laser cleaning method of claim 37, further comprising moving the stabilized laser beam along a cleaning path including a plurality of cleaning locations on the test piece in order to clean a plurality of probes on the test piece.

39. The laser cleaning method of claim 33, further comprising collecting dust or debris generated during cleaning of the test piece by the laser beam.

40. The laser cleaning method of claim 33, further comprising creating a laser energy compensation table including a plurality of compensation parameters based on a plurality of cleaning locations of the test piece.

\* \* \* \* \*